(12) United States Patent
Austin

(10) Patent No.: US 7,302,687 B2
(45) Date of Patent: Nov. 27, 2007

(54) COMPUTER APPARATUS, TERMINAL SERVER APPARATUS AND PERFORMANCE MANAGEMENT METHODS THEREFOR

(75) Inventor: Mark Austin, Cheshire (GB)

(73) Assignee: Appsense Limited, Cheshire (GB)

( * ) Notice: Subject to any disclaimer, the term of this patent is extended or adjusted under 35 U.S.C. 154(b) by 717 days.

(21) Appl. No.: 10/309,042

(22) Filed: Dec. 4, 2002

(65) Prior Publication Data
US 2003/0126184 A1  Jul. 3, 2003

(30) Foreign Application Priority Data
Dec. 6, 2001  (GB) ................... 0129221.8

(51) Int. Cl.
*G06F 9/44* (2006.01)
*G06F 9/50* (2006.01)
(52) U.S. Cl. ...................... 718/105; 718/102
(58) Field of Classification Search .............. 718/1, 718/100–108; 709/223–226
See application file for complete search history.

(56) References Cited

U.S. PATENT DOCUMENTS

| | | | | |
|---|---|---|---|---|
| 5,475,844 A | * | 12/1995 | Shiramizu et al. | 718/104 |
| 5,752,031 A | * | 5/1998 | Cutler et al. | 718/103 |
| 5,809,235 A | * | 9/1998 | Sharma et al. | 709/230 |
| 5,872,972 A | * | 2/1999 | Boland et al. | 718/102 |
| 5,898,870 A | * | 4/1999 | Okuda et al. | 718/104 |
| 5,996,083 A | | 11/1999 | Gupta et al. | |
| 6,026,425 A | * | 2/2000 | Suguri et al. | 718/105 |
| 6,067,557 A | * | 5/2000 | Hegde | 718/103 |

(Continued)

FOREIGN PATENT DOCUMENTS

| | | |
|---|---|---|
| JP | 2000-284976 | 10/2000 |
| JP | 2000-322365 | 11/2000 |
| WO | WO 01/48584 | 7/2001 |

OTHER PUBLICATIONS

Groth, Paul T. et al. "CPU Resource Control and Accounting in the NOMADS Mobile Agent System." ACM. 2000.*

(Continued)

*Primary Examiner*—Lewis A. Bullock, Jr.
(74) *Attorney, Agent, or Firm*—Squire Sanders & Dempsey L.L.P.

(57) ABSTRACT

The present invention discloses a computer apparatus (6-12) comprising a central processing unit (CPU) (32), means (28) for monitoring CPU load, and means (30) for reducing the CPU usage from at least one CPU demand source, thereby to reduce the CPU load, if the CPU monitoring means determines that a predetermined threshold CPU usage is at least reached in which the CPU usage reducing means comprises a thread clamper.

46 Claims, 4 Drawing Sheets

U.S. PATENT DOCUMENTS

| | | |
|---|---|---|
| 6,182,022 B1 | 1/2001 | Mayle et al. |
| 6,182,109 B1 * | 1/2001 | Sharma et al. ............. 718/104 |
| 6,237,024 B1 * | 5/2001 | Wollrath et al. ............ 709/203 |
| 6,269,391 B1 * | 7/2001 | Gillespie .................... 718/100 |
| 6,397,252 B1 * | 5/2002 | Sadiq ......................... 709/226 |
| 6,405,045 B1 * | 6/2002 | Choi et al. .................. 455/453 |
| 6,477,561 B1 * | 11/2002 | Robsman .................... 718/105 |
| 6,581,104 B1 * | 6/2003 | Bereiter ...................... 709/232 |
| 6,707,792 B1 * | 3/2004 | Volftsun et al. ............ 370/235 |
| 6,845,456 B1 * | 1/2005 | Menezes et al. ............ 713/320 |

OTHER PUBLICATIONS

Bettison, Andrew et al. "Limits—A System for UNIX Resource Administration." ACM. 1989.*

Jones, Michael B. et al. "CPU Reservations and Time Constraints: Efficient, Predicatable Scheduling of Independent Activities." ACM. 1997.*

Bellosa, F., "EndurIX OS-Directed Throttling of Processor Activity for Dynamic Power Management", Jun. 1999, pp. 1-5, University of Erlangen, Germany.

* cited by examiner

US 7,302,687 B2

COMPUTER APPARATUS, TERMINAL SERVER APPARATUS AND PERFORMANCE MANAGEMENT METHODS THEREFOR

FIELD OF THE INVENTION

The present invention relates to computer apparatus, terminal server apparatus and to performance management methods therefore, to computer programs for such methods and to data carriers comprising such computer programs.

BACKGROUND TO THE INVENTION

A terminal server environment consist of one or more terminal servers to which are networked (by any suitable connection) a plurality of thin client computer nodes. Application execution, data processing and, usually, data storage occur on the terminal servers. The user's thin client computer node acts primarily as a graphical user interface and does not carry out substantive application processing. Currently implementations of this environment include Windows 2000 Terminal Services, Windows NT4.0 Terminal Server (WTS) and MetaFrame (trade mark), the last of these working with the WTS. The MetaFrame implementation permits files to be stored locally on a user's computer node, whereas WTS does not.

In operation, each user logs on to a separate session with the terminal servers. Each user node uses a varying amount of terminal server central processing unit (CPU) time, or cycles. The amount of CPU time used, for instance, by a word processing application during normal typing tends to be quite small. However, if the user instructs the word processors to perform an intensive task, such as a complex macro, the application may use all of the available CPU capacity to perform the task as quickly as possible. A given application being utilised by a user's computer node typically will use a plurality of threads to interface with the CPU within any given process.

Where a computer is dedicated to a single user this is usually acceptable behaviour. However, for a terminal server environment, which is accessed concurrently by many users, this behaviour can become problematic, especially when several processes are performing CPU intensive tasks. Subsequently, all users logged on to the terminal servers will encounter performance issues and unresponsive sessions. During long periods of unresponsiveness the server can become unstable, which is particularly problematic as the system administrator will be unable to determine the cause and resolve the issue due to the unresponsiveness of the server.

It is an aim of preferred embodiments of the present invention to obviate or overcome a disadvantage of the prior art, whether referred to herein or otherwise.

SUMMARY OF THE INVENTION

According to the present invention in a first aspect, there is provided a computer apparatus comprising a central processing unit (CPU), means for monitoring CPU load, and means for reducing the CPU usage from at least one CPU demand source, thereby to reduce the CPU load, if the CPU monitoring means determines that a predetermined threshold CPU usage is at least reached, in which the CPU usage reducing means comprises a thread clamper.

Suitably, the CPU monitoring means comprises a CPU sampler. Suitably, the CPU sampler samples the CPU usage at a predetermined rate.

Suitably, the predetermined threshold must be at least reached for a plurality of samples before the CPU usage reducing means is activated.

Suitably, the predetermined threshold is 100% of the CPU capacity.

Suitably, a thread is clamped by limiting the amount of CPU capacity available to that thread. Suitably, a thread is clamped by temporarily suspending the relevant thread. Suitably, a thread is clamped by or to a predetermined percentage.

Suitably, the apparatus further comprises means for determining a thread to be clamped. Suitably, the thread determining means comprises means for determining the CPU usage of a process of which a thread forms a part and in which the CPU usage reducing means is only activated for the process if the CPU usage of the process at least reaches a predetermined threshold. Suitably, the thread determining means comprises means for determining the CPU usage of a thread and in which the CPU usage reducing means is only activated for the thread if the CPU usage of the thread at least reaches a predetermined threshold.

Suitably, the computer apparatus is a terminal server for connecting to a plurality of user computer nodes.

Suitably, each user is regarded as a CPU demand source.

Suitably, the terminal server comprises part of a server farm.

According to the present invention in a second aspect, there is provided a performance management method for a computer apparatus comprising a central processing unit (CPU), the method comprising the steps of monitoring the CPU usage and reducing the CPU usage from at least one CPU demand source if the CPU usage at least reaches a predetermined threshold, in which the CPU usage is reduced by thread clamping.

Suitably, the CPU usage is sampled at a predetermined rate.

Suitably, the predetermined threshold must be at least reached for a plurality of samples before the CPU usage is reduced.

Suitably, the predetermined threshold is 100% of the CPU capacity.

Suitably, a thread is clamped by temporarily suspending the relevant thread. Suitably, a thread is clamped by or to a predetermined percentage.

Suitably, a thread to be clamped is selectively determined. Suitably, the method further comprises determining the CPU usage of a process of which a thread forms a part and the CPU usage is only reduced for the process if the CPU usage of the process at least reaches a predetermined threshold. Suitably, the method further comprises determining the CPU usage of a thread and in which the CPU usage is only reduced for the thread if the CPU usage of the thread at least reaches a predetermined threshold.

Suitably, a thread is clamped for a predetermined period.

Suitably, a user or group of users is allocated a CPU usage allocation below which CPU usage will not be reduced.

Suitably, after reducing CPU usage, if the CPU usage still at least reaches a predetermined value, CPU usage is further reduced until it is below a predetermined value.

Suitably, the computer apparatus is a terminal server for connecting to a plurality of user computer nodes.

Suitably, the terminal server comprises part of a server farm.

Suitably, each user is regarded as a CPU demand source.

According to the present invention in a third aspect, there is provided a terminal server apparatus comprising a terminal server for connecting to a plurality of user computer nodes, the terminal server comprising a central processing unit (CPU), means for monitoring CPU load, and means for reducing the CPU usage from at least one user, thereby to reduce the CPU load, if the CPU monitoring means determines that a predetermined threshold CPU usage is at least reached, in which the CPU usage reducing means comprises a thread clamper.

Suitably, the terminal server comprises part of a server farm.

Suitably, the CPU monitoring means comprises a CPU sampler. Suitably, the CPU sampler samples the CPU usage at a predetermined rate.

Suitably, the predetermined threshold must be at least reached for a plurality of samples before the CPU usage reducing means is activated.

Suitably, the predetermined threshold is 100% of the CPU capacity.

Suitably, a thread is clamped by limiting the amount of CPU capacity available to that thread. Suitably, a thread is clamped by temporarily suspending the relevant thread. Suitably, a thread is clamped by or to a predetermined percentage.

Suitably, the apparatus further comprises means for determining a thread to be clamped. Suitably, the thread determining means comprises means for determining the CPU usage of a process of which a thread forms a part and in which the CPU usage reducing means is only activated for the process if the CPU usage of the process at least reaches a predetermined threshold. Suitably, the thread determining means comprises means for determining the CPU usage of a thread and in which the CPU usage reducing means is only activated for the thread if the CPU usage of the thread at least reaches a predetermined threshold.

According to the present invention in a fourth aspect, there is provided a performance management method for a terminal server apparatus comprising a terminal server for connecting to a plurality of user computer nodes, the terminal server comprising a central processing unit (CPU), the method comprising the steps of monitoring the CPU usage and reducing the CPU usage from at least one user if the CPU usage at least reaches a predetermined threshold, in which the CPU usage is reduced by thread clamping.

Suitably, the terminal server comprises part of a server farm.

Suitably, the CPU usage is sampled at a predetermined rate.

Suitably, the predetermined threshold must be at least reached for a plurality of samples before the CPU usage is reduced.

Suitably, the predetermined threshold is 100% of the CPU capacity.

Suitably, a thread is clamped by temporarily suspending the relevant thread. Suitably, a thread is clamped by or to a predetermined percentage.

Suitably, a thread to be clamped is selectively determined. Suitably, the method further comprises determining the CPU usage of a process of which a thread forms a part and the CPU usage is only reduced for the process if the CPU usage of the process at least reaches a predetermined threshold. Suitably, the method further comprises determining the CPU usage of a thread and in which the CPU usage is only reduced for the thread if the CPU usage of the thread at least reaches a predetermined threshold.

Suitably, a thread is clamped for a predetermined period.

Suitably, a user or group of users is allocated a CPU usage allocation below which CPU usage will not be reduced.

Suitably, after reducing CPU usage, if the CPU usage still at least reaches a predetermined value, CPU usage is further reduced until it is below a predetermined value.

The present invention extends to computer programs for carrying out the methods and to data carriers comprising such programs.

BRIEF DESCRIPTION OF THE DRAWINGS

The present invention will now be described, by way of example only, with reference to the drawings that follow; in which.

DESCRIPTION OF THE PREFERRED EMBODIMENTS

Figure 1:
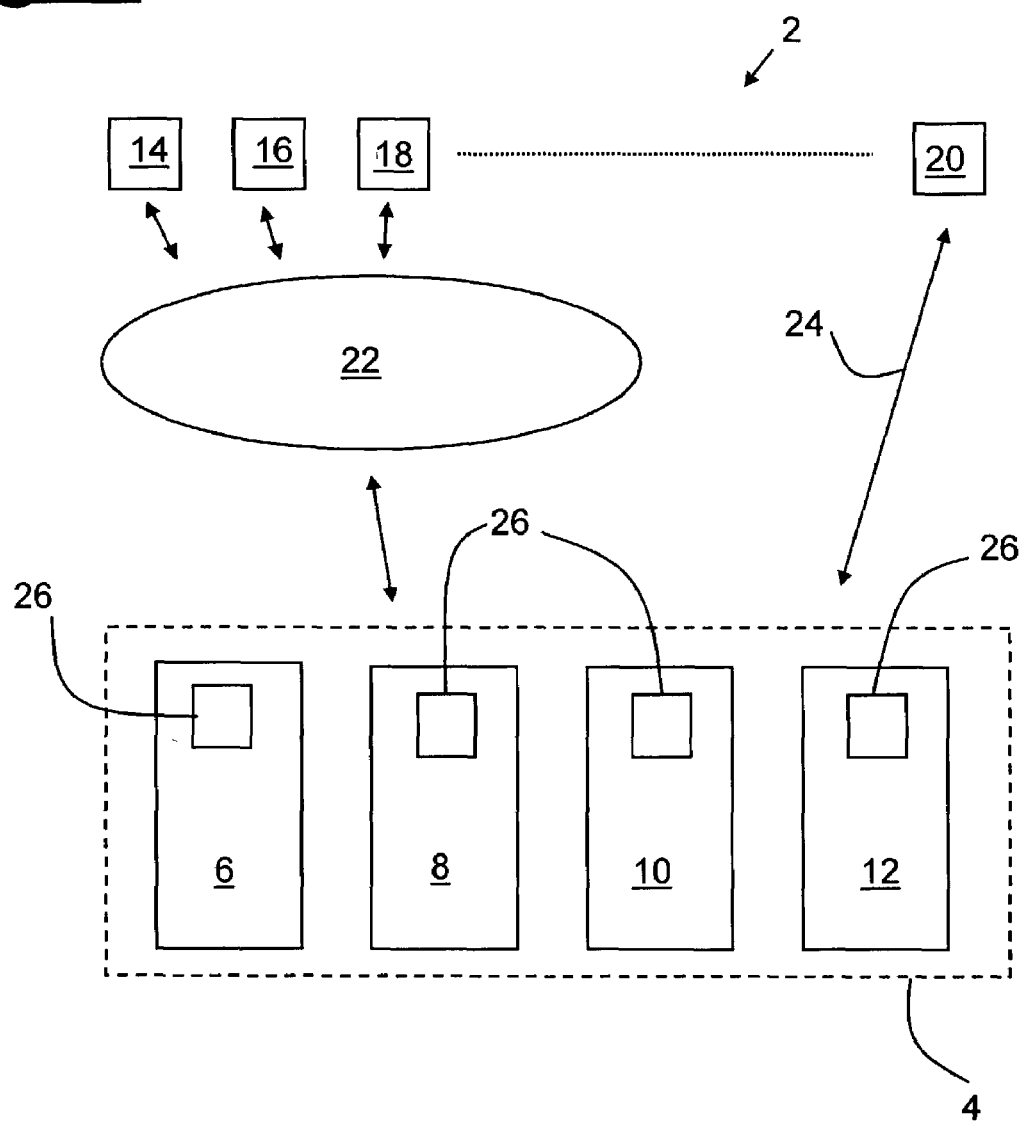
FIG. 1 is a schematic illustration of a terminal server environment according to the present invention.

Referring to FIG. 1 of the drawings that follow, there is shown a terminal server apparatus 2 comprising a server farm indicated schematically at 4, comprising a plurality of terminal servers 6, 8, 10, 12.

The terminal servers 6-12 of server farm 4 are networked to a plurality of user computer nodes such as user computer nodes 14, 16, 18, 20. User computer nodes 14-20 are typically computer terminals, but may be other networkable graphical user interfaces. User computer nodes 14-18 are networked to a terminal server 6, 8, 10 or 12 via the internet, indicated schematically at 22 whereas user node 20 has a local area network direct connection 24 to a terminal server 6-12. Other users are networked to other terminal servers in the server farm 4.

Performance management software, indicated schematically at 26 is present and executed separately on each terminal server 6-12 as described below.

In use, users log on through user nodes 14-20 to a terminal server 6-12 where applications are executed and data stored for the use of user nodes 14-20. Each user node 14-20 is regarded as a source of CPU demand for the applications and processes for which it seeks CPU time from the relevant terminal server 6-12.

Figure 2:
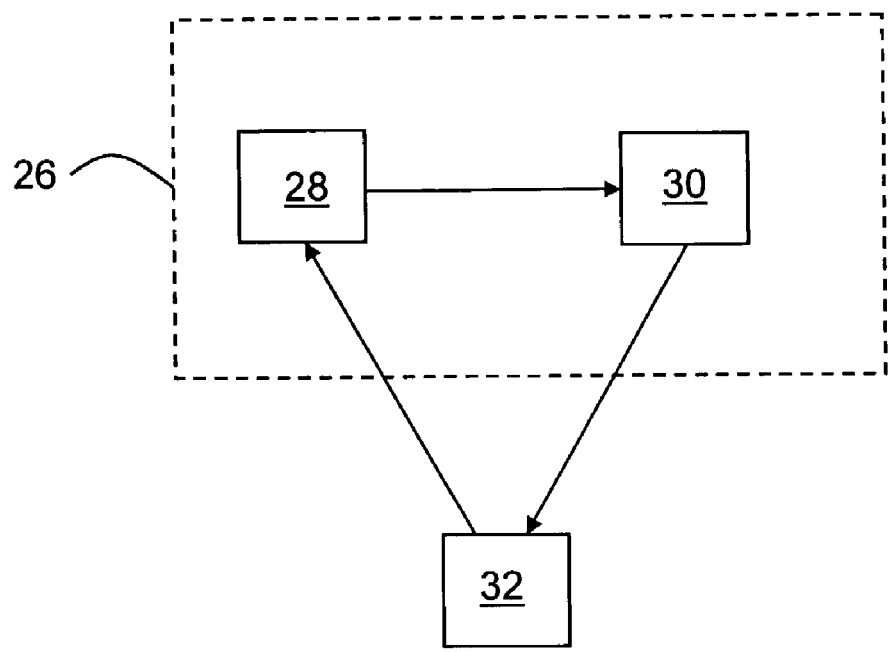
FIG. 2 is a schematic illustration of a performance manager of FIG. 1.

Referring to FIG. 2 of the drawings that follow, there is shown, as part of the performance manager software 26 a CPU sampler 28 and a CPU thread clamper 30. The CPU is indicated schematically at 32.

Figure 3:
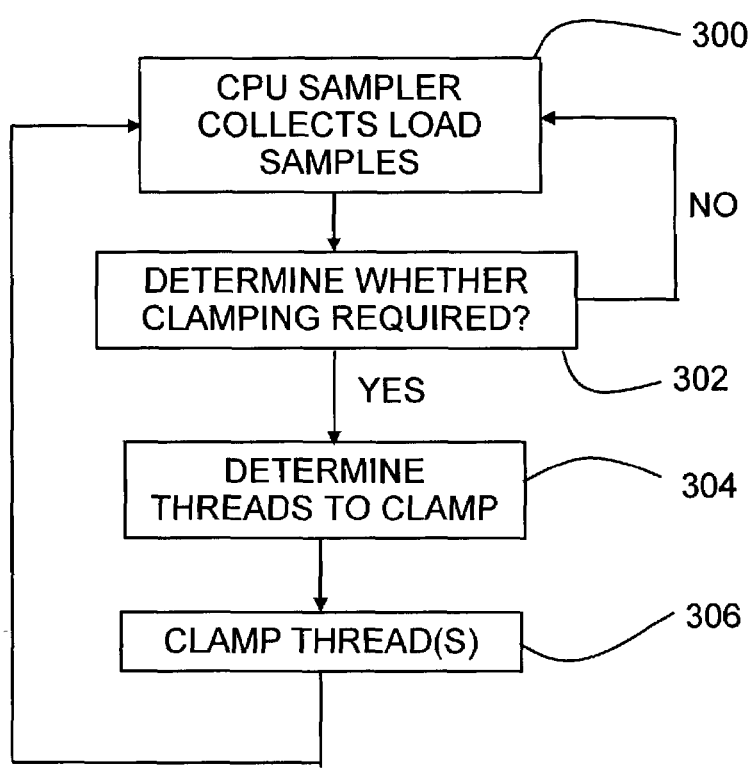
FIG. 3 is a functional flow diagram illustrating operation of the present invention.

Referring to FIG. 3 of the drawings that follow, operation of this embodiment of the present invention will now be described.

Initially, the following parameter variables are defined:

| Parameter | Description |
| --- | --- |
| sample_period (seconds) | This is the rate at which CPU samples will be collected. |
| samples_before_clamping (integer) | If the system CPU load remains at 100% for this number of samples then the performance manager will look for appropriate threads to clamp. |

-continued

| Parameter | Description |
|---|---|
| minimum_process_cpu (%) | The performance manager will never clamp threads that belong to a process that is consuming less than this percentage of the system CPU. |
| mimimum_thread_cpu (%) | The performance manager will never clamp threads that are consuming less than this percentage of the system CPU. |
| samples_to_clamp (integer) | Once the performance manager has started to clamp threads, this value instructs the performance manager to clamp the threads for this number of samples before releasing them. |
| clamp_quantity (%) | The performance manager will clamp threads by this percentage of the CPU capacity. |

These parameters may be adjusted by the system administrator.

In step 300, CPU sampler 28 collects "sample_period" samples per second. In step 302 it is determined whether clamping is required. Clamping is determined to be required if for "samples_before clamping" samples the CPU load remains at the predetermined value of 100%. Other CPU usage may be set, to avoid usage reaching 100% if desired. By way of example, a "sample_before clamping" value of 3, with a "sample_period" of 1 will instruct the performance manager 26 to start clamping threads if the system CPU load remains at 100% for three seconds.

If clamping is not required, the process returns to sampling the CPU load (step 300). If, however, clamping is required, in step 304 it is determined which of the threads currently using CPU capacity is/are to be clamped.

Any given process may include a plurality of threads therein. To enable both processes and threads within them to be assessed for clamping, first the sampler determines whether the CPU load for a given process exceeds the "minimum_process CPU" value. If the "minimum_process CPU" value is not exceeded the performance manager 26 will not clamp the threads within that process regardless of the amount of CPU load the individual threads are using.

The performance manager will only clamp threads that are occupying a significant percentage of the CPU load. The performance manager compares the sampled CPU load for a given thread with the "minimum_process CPU" variable and will only clamp the corresponding thread if the CPU load exceeds that percentage.

Typical values for "minimum_process_cpu" and "minimum_thread_cpu" are 5%.

Once one or more threads has or have been determined to be clamped, the performance manager will (step 306) clamp the thread or threads by the "clamp_quantity" percentage of the CPU capacity for a predetermined period, being the "samples_to_clamp" number of samples before releasing them, say 10 samples.

The performance manager CPU thread clamper 30 clamps threads by suspending and resuming threads at extremely small intervals (typically, millisecond rates). For instance, to clamp a set of threads at 95%, the performance manager will suspend and resume the set of threads over a short period of time (a fraction of a second) and will ensure that the threads are suspended for 5% of this time, making it impossible for the clamped threads to consume any more than 95% of the overall CPU between them. By only suspending threads for millisecond periods, those sessions in which threads are being clamped will avoid jerky responses and the clamping will hardly be noticeable to the user.

Sampling then re-occurs to determine whether additional clamping is required.

Thus the performance manager 26 will only clamp threads when the total system CPU load remains at 100% of the number of samples defined in the "samples_before_clamping" parameter. Once one or more sessions have been identified for clamping, the performance manager CPU thread clamper 30 will clamp any thread(s) in these sessions that are using more than the minimum levels of CPU capacity (defined by "minimum_process CPU" and "minimum_thread CPU"). It will clamp these threads by a set amount ("clamp_quantity"). For instance if the "clamp_quantity" is 5 then the performance manager will clamp all the threads to be clamped by 5%. This will ensure that all of the clamp threads are confined to 95% of the CPU capacity. If the spare CPU is consumed immediately then the performance manager will progressively apply heavier clamping, by again identifying the set of threads to clamp, but each time it will clamp by an additional "clamp_quantity" until the CPU 32 is not saturated. Once the CPU 32 has been clamped to the required level then the performance manager 26 will keep the clamp in place for the number of samples defined in the "samples_to_clamp" parameter. Once this period is complete the performance manager 26 will release the clamped threads. If however the CPU 32 returns to full load then the performance manager 26 will re-apply the clamping algorithm immediately.

In a further embodiment of the present invention, each user or group of users can be assigned a CPU share factor. By default, all users have a share factor of 1. This share factor is used to determine which users are consuming too much CPU. The system account is also counted in the number of users and can also be given a factor, which also defaults to 1.

For example, if four users 14-20 are logged on to a terminal server 6-12 then there are five sessions in total, if the system account (not shown) is included. If all of the users have a default share factor of 1 then they are allocated 20% (100%/5) of the CPU capacity each by the performance manager 26 when it is determining which sessions to clamp. Therefore each user can use up to 20% of the overall CPU and performance manager will not clamp any threads within that particular sessions. Some users may be allocated a greater or lesser share if desired.

Figure 4:
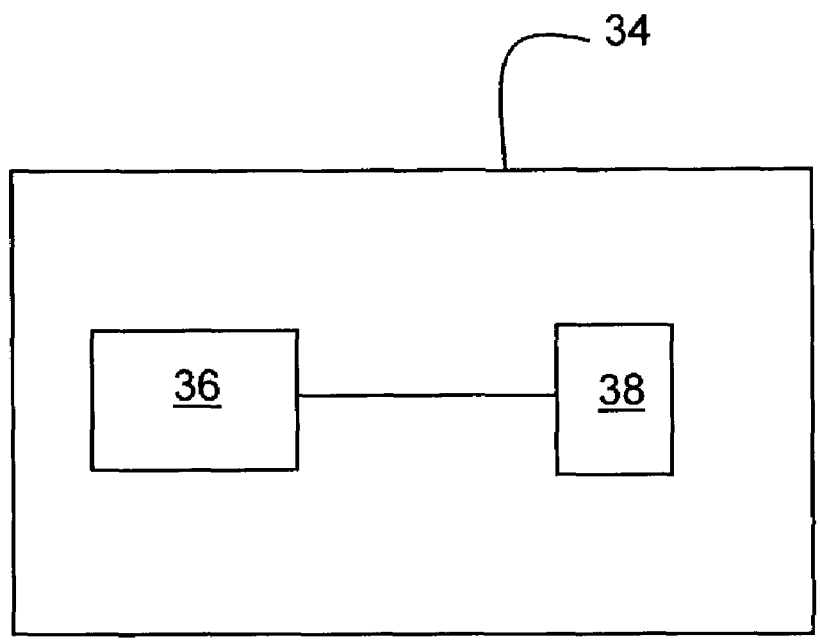
FIG. 4 is a schematic illustration of a computer apparatus according to the present invention.

Although the present invention is intended primarily for use with terminal server applications, for which it is particularly advantageous, embodiments thereof, as shown in FIG. 4 of the drawings that follow may be used with and for single computer node (eg desktop) devices. In FIG. 4 a computer apparatus 34 comprises a user's computer node, which computer apparatus 34 comprises a CPU 36 and a performance manager application 38 therefor. The performance manager 38 operates as described above for terminal server applications, except in this case it monitors only local usage of the CPU 36 (CPU demand source) and the CPU runs applications and processes for the computer apparatus 34.

The present invention can be implemented on a variety of operating systems, including UNIX, WINDOWS and MACINTOSH (trade marks).

The present invention is not limited to the described terminal server architecture.

By implementing preferred embodiments of the present invention application performance and responsiveness can be maintained.

The invention claimed is:

1. A computer apparatus comprising a central processing unit (CPU), means for monitoring CPU load, and means for reducing the CPU usage from at least one CPU demand source, thereby to reduce the CPU load, if the CPU monitoring means determines that a predetermined threshold CPU usage is at least reached, in which the CPU usage reducing means comprises a thread damper, and in which a thread is clamped by temporarily suspending the relevant thread whereby the thread is clamped by or to a predetermined percentage, the apparatus further comprising means for adjusting the predetermined percentage.

2. A computer apparatus according to claim 1, in which the CPU monitoring means comprises a CPU sampler.

3. A computer apparatus according to claim 2, in which the CPU sampler samples the CPU usage at a predetermined rate.

4. A computer apparatus according to claim 1, in which the predetermined threshold must be at least reached for a plurality of samples before the CPU usage reducing means is activated.

5. A computer apparatus according to claim 1, in which the predetermined threshold is 100% of the CPU capacity.

6. A computer apparatus according to claim 1, in which the apparatus further comprises means for determining a thread to be clamped.

7. A computer apparatus according to claim 6 in which the thread determining means comprises means for determining the CPU usage of a process of which a thread forms a part and in which the CPU usage reducing means is only activated for the process if the CPU usage of the process at least reaches a predetermined threshold.

8. A computer apparatus according to claim 6 in which the thread determining means comprises means for determining the CPU usage of a thread and in which the CPU usage reducing means is only activated for the thread if the CPU usage of the thread at least reaches a predetermined threshold.

9. A computer apparatus according to claim 1, in which the computer apparatus is a terminal server for connecting to a plurality of user computer nodes.

10. A computer apparatus according to claim 9 in which each user is regarded as a CPU demand source.

11. A computer apparatus according to claim 9, in which the terminal server comprises part of a server farm.

12. A performance management method for a computer apparatus comprising a central processing unit (CPU), the method comprising the steps of monitoring the CPU usage and reducing the CPU usage from at least one CPU demand source if the CPU usage at least reaches a predetermined threshold, in which the CPU usage is reduced by thread clamping, in which a thread is clamped by temporarily suspending the relevant thread whereby the thread is clamped by or to a predetermined percentage, and providing means for adjusting the predetermined percentage.

13. A performance management method for a computer apparatus according to claim 12, in which the CPU usage is sampled at a predetermined rate.

14. A performance management method for a computer apparatus according to claim 12, in which the predetermined threshold must be at least reached for a plurality of samples before the CPU usage is reduced.

15. A performance management method for a computer apparatus according to claim 12, in which the predetermined threshold is 100% of the CPU capacity.

16. A performance management method for a computer apparatus according to claim 12 in which a thread to be clamped is selectively determined.

17. A performance management method for a computer apparatus according to claim 16 in which the method further comprises determining the CPU usage of a process of which a thread forms a part and the CPU usage is only reduced for the process if the CPU usage of the process at least reaches a predetermined threshold.

18. A performance management method for a computer apparatus according to claim 16 in which the method further comprises determining the CPU usage of a thread and in which the CPU usage is only reduced for the thread if the CPU usage of the thread at least reaches a predetermined threshold.

19. A performance management method for a computer apparatus according to claim 12, in which a thread is clamped for a predetermined period.

20. A performance management method for a computer apparatus according to claim 12, in which a user or group of users is allocated a CPU usage allocation below which CPU usage will not be reduced.

21. A performance management method for a computer apparatus according to claim 12, in which after reducing CPU usage, if the CPU usage still at least reaches a predetermined value, CPU usage is further reduced until it is below a predetermined value.

22. A performance management method for a computer apparatus according to claim 12, in which the computer apparatus is a terminal server for connecting to a plurality of user computer nodes.

23. A performance management method for a computer apparatus according to claim 22, in which the terminal server comprises part of a server farm.

24. A performance management method for a computer apparatus according to claim 22, in which each user is regarded as a CPU demand source.

25. A computer program executed by the CPU for carrying out the method of claim 12.

26. A terminal server apparatus comprising a terminal server for connecting to a plurality of user computer nodes, the terminal server comprising a central processing unit (CPU), means for monitoring CPU load, and means for reducing the CPU usage from at least one user, thereby to reduce the CPU load, if the CPU monitoring means determines that a predetermined threshold CPU usage is at least reached, in which the CPU usage reducing means comprises a thread damper, and in which a thread is clamped by temporarily suspending the relevant thread whereby the thread is clamped by or to a predetermined percentage, the apparatus further comprising means for adjusting the predetermined percentage.

27. terminal server apparatus according to claim 26, in which the terminal server comprises part of a server farm.

28. A terminal server apparatus according to claim 26, in which the CPU monitoring means comprises a CPU sampler.

29. A terminal server apparatus according to claim 28, in which the CPU sampler samples the CPU usage at a predetermined rate.

30. A terminal server apparatus according to claim 26 in which the predetermined threshold must be at least reached for a plurality of samples before the CPU usage reducing means is activated.

31. A terminal server apparatus according to claim 26 in which the predetermined threshold is 100% of the CPU capacity.

32. A terminal server apparatus according to claim 26 in which the apparatus further comprises means for determining a thread to be clamped.

33. A terminal server apparatus according to claim 32 in which the thread determining means comprises means for determining the CPU usage of a process of which a thread forms a part and in which the CPU usage reducing means is only activated for the process if the CPU usage of the process at least reaches a predetermined threshold.

34. A terminal server apparatus according to claim 32, in which the thread determining means comprises means for determining the CPU usage of a thread and in which the CPU usage reducing means is only activated for the thread if the CPU usage of the thread at least reaches a predetermined threshold.

35. A performance management method for a terminal server apparatus comprising a terminal server for connecting to a plurality of user computer nodes, the terminal server comprising a central processing unit (CPU), the method comprising the steps of monitoring the CPU usage and reducing the CPU usage from at least one user if the CPU usage at least reaches a predetermined threshold, in which the CPU usage is reduced by thread clamping, and in which a thread is clamped by temporarily suspending the relevant thread, whereby the thread is clamped by or to a predetermined percentage, and providing means for adjusting the predetermined percentage.

36. A performance management method for a terminal server apparatus according to claim 35, in which the terminal server comprises part of a server farm.

37. A performance management method for a terminal server apparatus according to claim 35, in which the CPU usage is sampled at a predetermined rate.

38. A performance management method for a terminal server apparatus according to claim 35, in which the predetermined threshold must be at least reached for a plurality of samples before the CPU usage is reduced.

39. A performance management method for a terminal server apparatus according to claim 35 in which the predetermined threshold is 100% of the CPU capacity.

40. A performance management method for a terminal server apparatus according to claim 35 in which a thread to be clamped is selectively determined.

41. A performance management method for a terminal server apparatus according to claim 40 in which the method further comprises determining the CPU usage of a process of which a thread forms a part and the CPU usage is only reduced for the process if the CPU usage of the process at least reaches a predetermined threshold.

42. A performance management method for a terminal server apparatus according to claim 40, in which the method further comprises determining the CPU usage of a thread and in which the CPU usage is only reduced for the thread if the CPU usage of the thread at least reaches a predetermined threshold.

43. A performance management method for a terminal server apparatus according claim 35 in which a thread is clamped for a predetermined period.

44. A performance management method for a terminal server apparatus according to claim 35 in which a user or group of users is allocated a CPU usage allocation below which CPU usage will not be reduced.

45. A performance management method for a terminal server apparatus according to claim 35 in which after reducing CPU usage, if the CPU usage still at least reaches a predetermined value, CPU usage is further reduced until it is below a predetermined value.

46. A data carrier comprising a computer program executed by the CPU for carrying out the method of claim 12.

* * * * *